Sept. 9, 1924.
O. H. PARSONS
COMBINATION STARTER FOR AUTOMOBILES
Filed Jan. 8, 1924      3 Sheets-Sheet 1
1,508,290
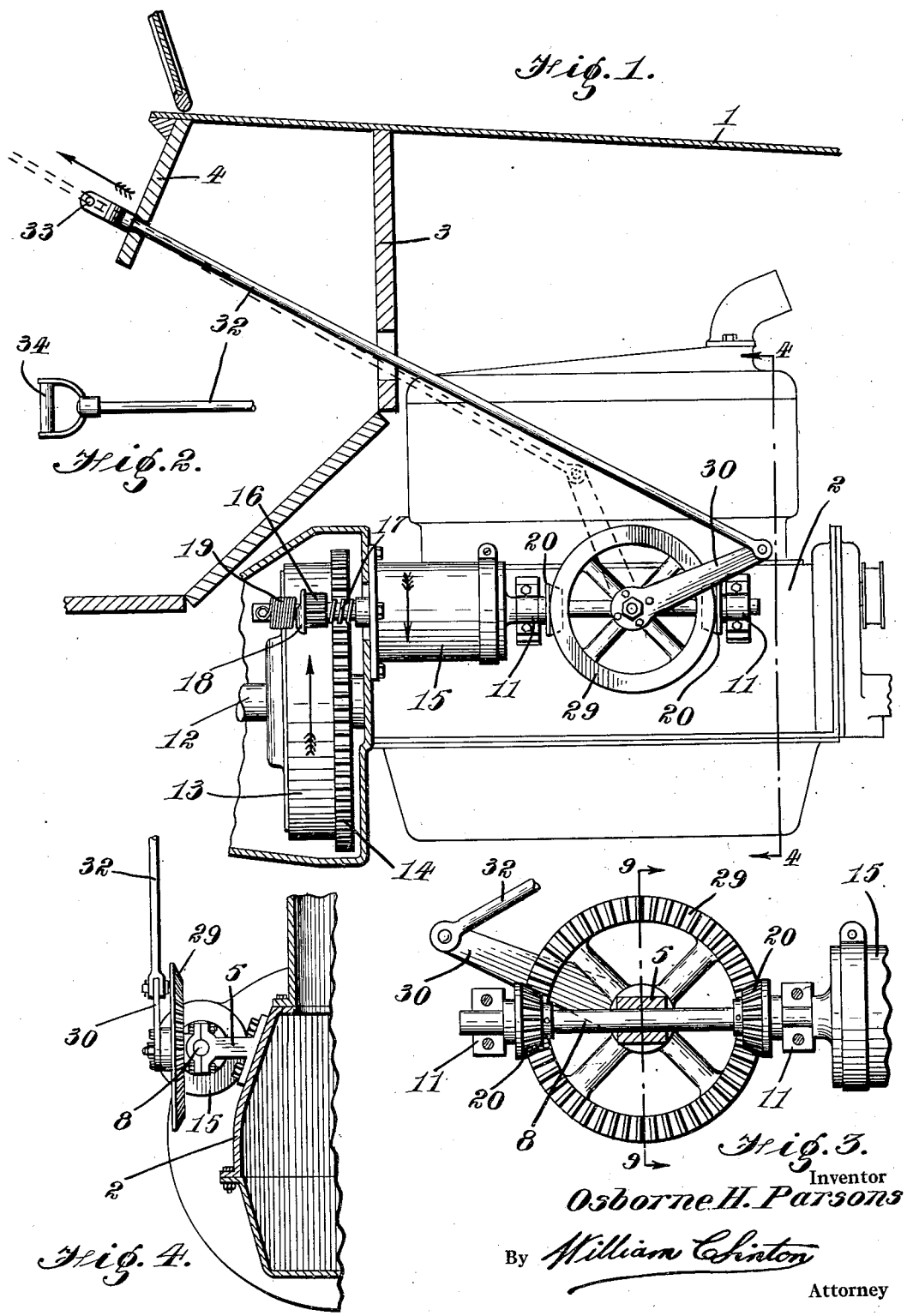

Sept. 9, 1924.  
O. H. PARSONS  
COMBINATION STARTER FOR AUTOMOBILES  
Filed Jan. 8, 1924     3 Sheets-Sheet 2

Inventor  
Osborne H. Parsons  
By William C. Sinton  
Attorney

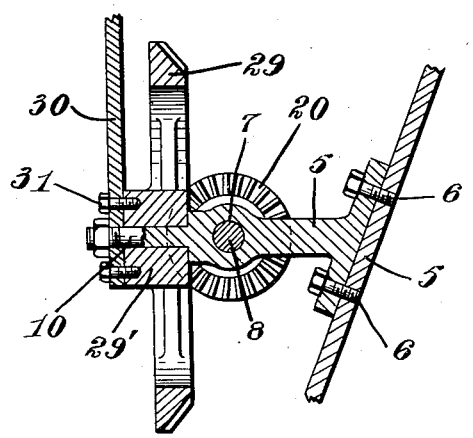
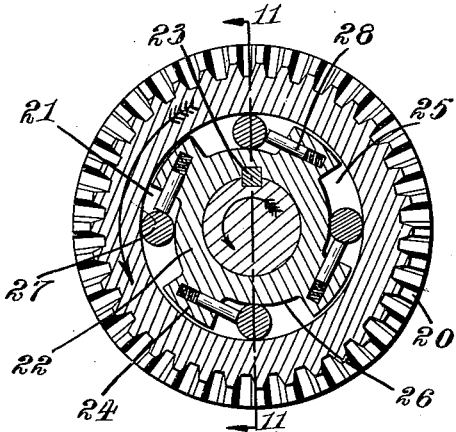
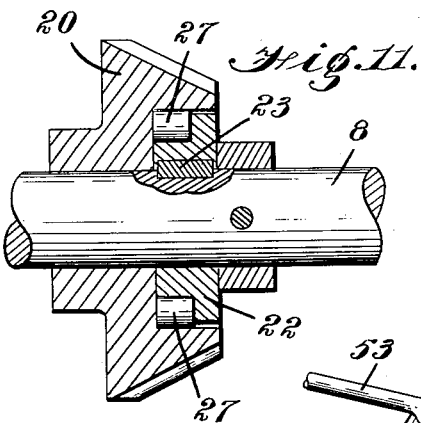
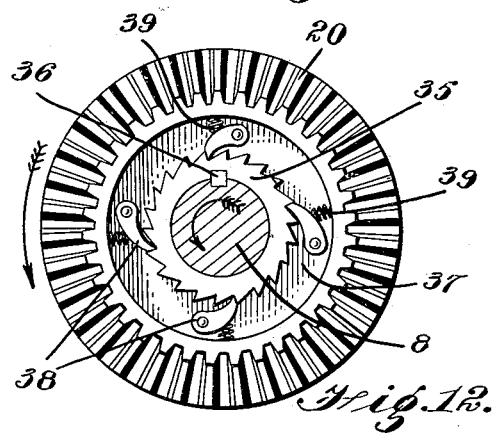
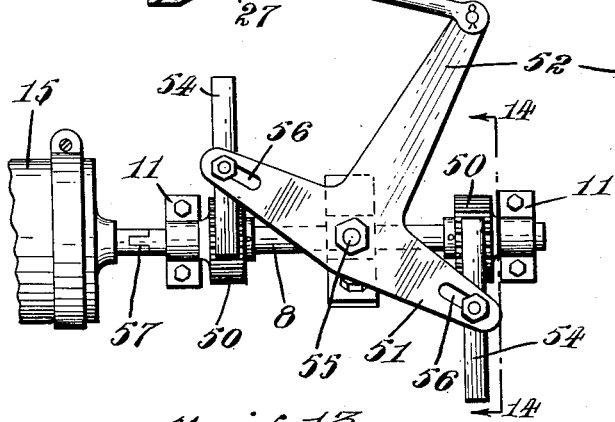
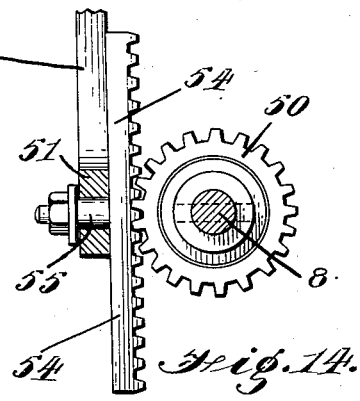

Patented Sept. 9, 1924.

1,508,290

UNITED STATES PATENT OFFICE.

OSBORNE H. PARSONS, OF HALIFAX, NOVA SCOTIA, CANADA.

COMBINATION STARTER FOR AUTOMOBILES.

Application filed January 8, 1924. Serial No. 685,072.

*To all whom it may concern:*

Be it known that I, OSBORNE H. PARSONS, a subject of the King of Great Britain, residing at Halifax, Province of Nova Scotia, Canada, have invented certain new and useful Improvements in Combination Starters for Automobiles; and I do hereby declare that the following is a full, clear, and exact description of the invention, such as will enable others skilled in the art to which it appertains to make and use the same.

The present invention pertains to a novel hand starter for automobiles designed to turn over the engine particularly when the electric starter is defective.

As is well known in the operation of motor vehicles, the batteries controlling the starter often become weak, or the starter becomes defective, and the engine must be turned over by hand. It requires that the driven must leave the seat and turn the crank at the front end of the vehicle. Turning the crank by hand often results in sprained or broken limbs in addition to the discomfort involved in leaving one's position in the vehicle.

The present invention in aiming to overcome these difficulties, provides for a hand starter adapted to operate on the drive shaft of the electric starter. The hand starter is connected by suitable linkages to the dashboard where it is easily within reach of the driver.

The invention further provides for a construction applicable to automobiles not having an electric starter. In this case, there is provided a shaft corresponding to the drive shaft of the starter, but adapted for direct connection to the gear on the fly wheel. The shaft is actuated from the dashboard by linkages of the same character as that already referred to.

The invention is fully disclosed in the following description and in the accompanying drawings in which:

Figure 1 is a side elevation of a preferred form of the invention;

Figure 2 is an elevation of the operating handle;

Figure 3 is an elevation of the gearing, showing the side opposite to that disclosed in Fig. 1;

Figure 4 is a section on the line 4—4 of Figure 1;

Figure 9 is a section on the line 9—9 of Figure 3;

Figure 10 is a section through one of the bevel gears showing the overrunning clutch;

Figure 11 is a section on the line 11—11 of Figure 10;

Figure 12 is a section similar to Figure 10, showing a modified form of clutch mechanism;

Figure 13 is an elevation of a still further modified form of hand starter; and, Figure 14 is a section on the line 14—14 of Figure 13.

Reference will now be had to these views by means of like characters which are employed to designate corresponding parts throughout.

Figure 5:
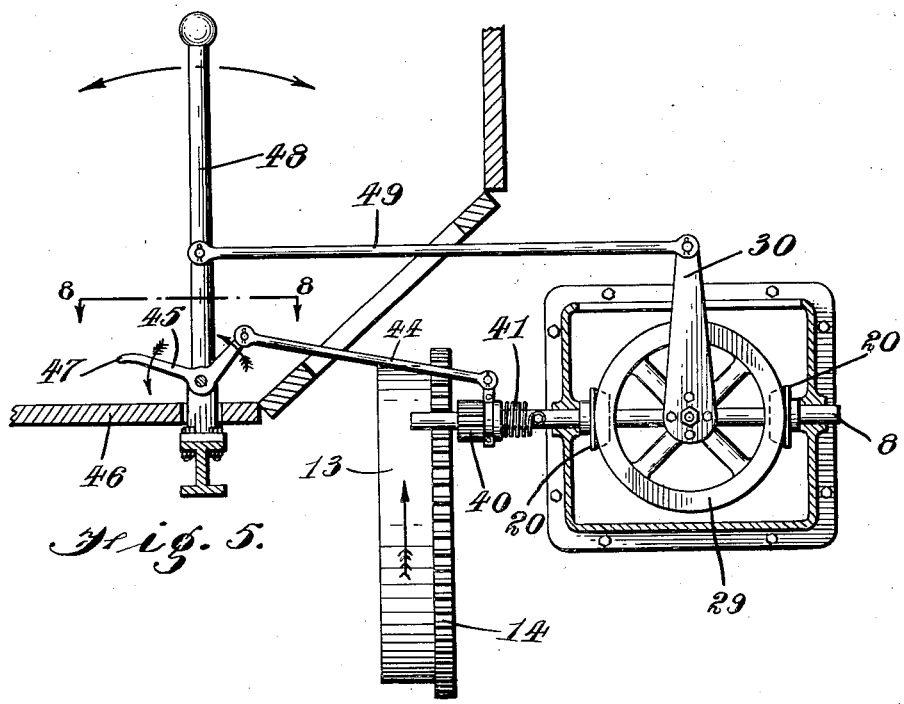
Figure 5 is an elevation of a modified form adapted for use where no electric starter is installed, there being provided a shaft corresponding to that of an electric starter.
Figure 6:
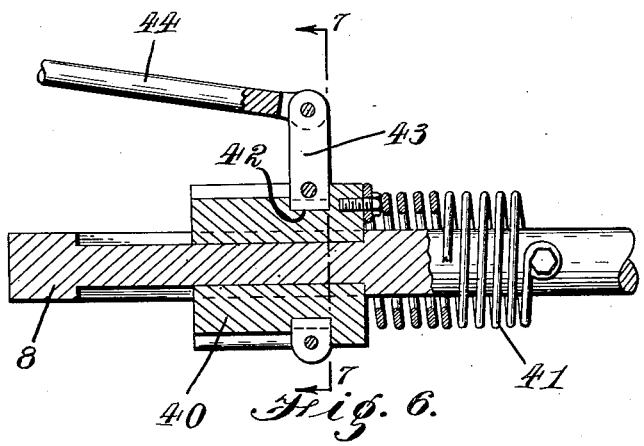
Figure 6 is a longitudinal sectional detail thereof.
Figure 7:
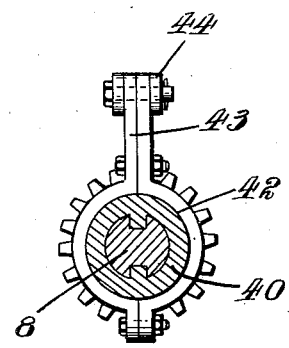
Figure 7 is a section on the line 7—7 of Figure 6.
Figure 8:
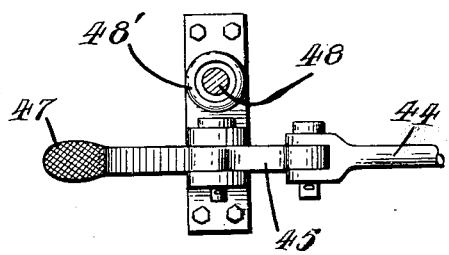
Figure 8 is a section on the line 8—8 of Figure 5.

In Figure 1 is disclosed in a diagrammatic manner the front end of an automobile comprising a hood 1, crank case 2, cowl board 3 and dashboard 4.

To a side of the crank case is fixed a substantially horizontal arm 5 (Figure 9) by means of bolts 6. The arm is intermediately formed with an aperture 7 which serves as a bearing for a shaft 8 lying parallel to the longitudinal axis of the vehicle. The free end of the arm is formed in the nature of a stub shaft 10, as illustrated in Figure 9. The shaft 8 is further supported at its ends in bearings 11 secured to the side of the crank case.

In Figure 1 is also shown the power shaft 12 of the engine carrying the fly wheel 13 on which is formed a gear 14. There is further provided an electric starter 15 of the usual character, the drive shaft thereof being a continuation of the shaft 8. The drive shaft of the starter is brought into connection with the fly wheel by means of the usual Bendix drive comprising a slidable gear 16 mounted on a shaft having a worm 17, the gear carrying a weight 18 to hold it against rotation when out of engagement with the gear 14, and normally pulled out of engagement therewith by means of a spring 19.

The portion of the shaft 18 which is disposed outside of the starter carries a pair of spaced bevel gears 20. These are so connected to the shaft that they are adapted to rotate in the same direction and to run idly in the opposite direction. In order to accomplish this function, each gear may be formed with a large central aperture 21. Within the aperture is disposed a clutch element 22 secured to the shaft 8 by means of a key 23. The clutch element is provided with a plurality of spaced peripheral lugs 24 forming channels 25 therebetween. The portions of the clutch element surface comprising the floors of the channels are each eccentric with reference to the inner wall of the aperture 21, as shown by the numeral 26. Within each channel is placed a cylindrical pawl 27 of such diameter as to ride loosely when carried in the larger end of a channel and to bind between the gear and clutch element when in the narrower end. Each pawl is normally held near the centre of its channel by means of a spring cushioned pin 28 extending into an adjacent lug 24.

On the stub shaft 10 is loosely mounted a bevel ring gear 29 engaging the two bevel pinions 20. The clutch elements within the pinions are disposed oppositely to each other, so that only one of them will be rotated regardless of the direction of rotation with the gear 29. Moreover, the shaft 8 will revolve in the same direction regardless of which pinion is actuated.

To the free end of the stub shaft 10 is journaled an arm 30 secured to the hub 29' of the gear 29 by means of bolts 31. From this arm extends a link 32 passing through the cowl board 3 and dashboard 4. At its free end this link is formed with an aperture 33 for the attachment of a handle 34.

In Figure 12 is shown a clutch mechanism which may be employed instead of that shown in Figure 10. It comprises a ratchet wheel 35 keyed to the shaft 8 as at 36. The gear carries an internal disc 37 to which is pivoted a plurality of pawls 38 adapted for engagement with the ratchet wheel. Springs 39 secured to the gear press the pawls into engagement with the ratchet. The springs may be of any desired construction. It will be obvious that when the gear turns in one direction, the ratchet and shaft 8 will be carried therewith, while during the opposite rotation the pawls will merely slip over the ratchet teeth.

In Figure 5 is shown a modified form of the invention adapted for use on vehicles not having an electric starter. The shaft 8 has slidably mounted thereon a pinion 40 normally pulled out of engagement with the gear 14 by means of a spring 41 pinned to the shaft. The pinion is formed with a circumferential groove 42 in which is received a band or yoke 43. The yoke has pivoted thereto a link 44 which is also connected to a bell crank lever 45 pivoted to the floor 46 of the automobile. One end of this lever is formed in the nature of a pedal 47 so that it may be operated by the foot of the driver. An operating lever 48 connected to the arm 30 by means of a link 49 is pivoted to the chassis by means of a ball and socket joint 48'. It will be understood, however, that the foot-operated mechanism 40-47 may be replaced by the Bendix drive of Figure 1, if desired.

The shaft 8 carries a pair of straight pinions 50 provided with internal clutch mechanisms of the character already described. To the free end of the arm 5 is pivoted a rocker arm 51 having a stem 52 extending therefrom. To the stem is attached a link 53 connected to a suitable device within the reach of the driver, whereby the arm may be rocked. Adjacent the pinions 50 a pair of racks 54 are slidably mounted for engagement therewith. These racks may be suitably guided in beds or casings formed on the interior of the crank case. They are further loosely connected to the ends of the rocker arm by means of pins 55 extending from the racks and received in the slots 56 in the ends of the arm. By reason of this pin and slot connection, the racks are adapted to slide in a straight line regardless of the arcuate movement of the ends of the rocker arm when swung on its pivot.

The pinion carrying portion of the shaft 8 may be rendered separable from the drive shaft of the starter by means of any suitable joint such as a lug and socket connection 57, as shown in Figure 13. Due to this construction, either the electric starter or the hand starter may be removed when desired.

In the operation of the device shown in Figures 1, 2, 3 and 4, the handle 34 is manipulated when the device is to be used. The hand starter is brought into action when the batteries of the electric starter are run down or too weak to turn over the engine. The motion of the handle 34 is transferred through the link 32 to the arm 30, whereby the ring gear 39 is oscillated. The pinions 20 move alternately in the same direction, as a result of which the shaft 8 is constantly rotated in one direction. The shaft of the electric starter is thereby turned whereupon the starter functions in the usual manner, the slidable gear 16 being drawn into engagement with the gear 14 by means of the threads 17. After the fly wheel 13 and gear 14 have attained enough working speed, the pinion 16 is thrown out of engagement with the gear 14 according to the usual operation of the Bendix drive. The action on the handle 13 is now discontinued and the starter 15 is stopped.

In the use of the device shown in Figures 5 to 8, the pinion 40 is brought into engagement with the gear 14 by pressure on the pedal 47. The lever 48 is now oscillated, imparting a similar movement to the arm 30 and actuating the shaft 8 in a manner already described. After the engine has been thus started, the hand starting mechanism is detached by releasing the pressure on the pedal 47, whereby the spring 41 withdraws the pinion 40 from the gear 14. If the spring is not sufficiently strong for this purpose, the same result may be obtained by imparting an upward stroke to the pedal.

In the device shown in Figure 13, the stem 52 is oscillated in the same manner as the arm 30 of Figures 1 and 5. The racks 54 are consequently moved vertically in opposite directions whereby the pinions 50 and shaft 8 are operated in the same manner as the bevel pinions 20 and shaft 8 of the other constructions.

While specific embodiments of the invention have been illustrated and described, it is to be understood that various alterations in the details of construction may be made without departing from the spirit of the invention as indicated by the appended claims.

Having thus fully described the invention, what I claim as new and desire to protect by Letters Patent is:—

1. In combination with the drive shaft of an electric starter for automobiles, a pair of pinions carried by said shaft, clutch connections between the shaft and the pinions whereby the latter are adapted to turn the shaft in one direction and to rotate idly in the opposite direction, and a gear meshing with said pinions for turning the same.

2. In combination with the crank case and electric starter of a vehicle, an arm secured to said crank case and adapted to support the drive shaft of said starter, a pair of pinions carried by said shaft, clutch connections between the shaft and the pinions whereby the latter are adapted to turn the shaft in one direction and to rotate idly in the opposite direction, and means for turning said pinions.

3. In combination with a motor vehicle comprising a crank case and an electric starter, an arm secured to said crank case and adapted to support the drive shaft of said starter, a pair of pinions carried by said shaft, clutch connections between the shaft and the pinions whereby the latter are adapted to turn the shaft in one direction and to rotate idly in the opposite direction, a stub shaft formed at the free end of said arm, and a gear journaled on said shaft and engaging said pinions for turning the same.

4. In combination with a motor vehicle comprising a crank case and an electric starter, an arm secured to said crank case and adapted to support the drive shaft of said starter, a pair of pinions carried by said shaft, clutch connections between the shaft and the pinions whereby the latter are adapted to turn the shaft in one direction and to rotate idly in the opposite direction, a stub shaft formed at the free end of said arm, a gear journaled on said stub shaft and engaging said pinions for turning the same, and a lever mounted on the stub shaft and secured to said gear.

5. In combination with a motor vehicle comprising a crank case and an electric starter, an arm secured to said crank case and adapted to support the drive shaft of said starter, a pair of pinions carried by said shaft, clutch connections between the shaft and the pinions whereby the latter are adapted to turn the shaft in one direction and to rotate idly in the opposite direction, a stub shaft formed at the free end of said arm, a gear journaled on said shaft and engaging said pinions, a lever mounted on the shaft and secured to said gear, and an operating link attached to said lever.

In witness whereof I have hereunto set my hand.

OSBORNE H. PARSONS.